(12) United States Patent
Chibon et al.

(10) Patent No.: US 12,498,941 B2
(45) Date of Patent: Dec. 16, 2025

(54) GENERATING FILESYSTEM IMAGES WITH INTEGRATED CONTAINER REGISTRIES HAVING CONTAINER RUNTIME TO INITIATE THE FIRST CONTAINER IMAGE

(71) Applicant: Red Hat, Inc., Raleigh, NC (US)

(72) Inventors: Pierre-Yves Chibon, Puteaux (FR); Leigh Griffin, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 71 days.

(21) Appl. No.: 18/326,405

(22) Filed: May 31, 2023

(65) Prior Publication Data
US 2024/0403068 A1 Dec. 5, 2024

(51) Int. Cl.
*G06F 9/445* (2018.01)
*G06F 9/455* (2018.01)

(52) U.S. Cl.
CPC ...... *G06F 9/44505* (2013.01); *G06F 9/45508* (2013.01)

(58) Field of Classification Search
CPC ............................ G06F 9/4405; G06F 9/44508
See application file for complete search history.

(56) References Cited

U.S. PATENT DOCUMENTS

| | | | |
|---|---|---|---|
| 10,379,841 B2 | 8/2019 | Wong et al. | |
| 10,931,746 B2 | 2/2021 | Scrivano | |
| 11,513,877 B2 * | 11/2022 | Biernat | G06F 9/45558 |
| 12,001,407 B2 * | 6/2024 | Chibon | G06F 16/122 |
| 2016/0205518 A1 * | 7/2016 | Patel | H04L 41/0895 455/518 |
| 2018/0285165 A1 | 10/2018 | Helsley | |
| 2019/0251190 A1 | 8/2019 | Scrivano | |
| 2020/0145479 A1 | 5/2020 | Scrivano | |
| 2020/0274927 A1 | 8/2020 | Richmond et al. | |
| 2021/0097037 A1 | 4/2021 | Babol et al. | |
| 2021/0146950 A1 | 5/2021 | Lee et al. | |

(Continued)

FOREIGN PATENT DOCUMENTS

| | | |
|---|---|---|
| CN | 112306520 A | 2/2021 |
| CN | 113239359 A | 8/2021 |

OTHER PUBLICATIONS

Final Office Action for U.S. Appl. No. 17/717,552, dated Oct. 12, 2023, 17 pages.

(Continued)

*Primary Examiner* — Tammara R Peyton
(74) *Attorney, Agent, or Firm* — Dority & Manning, P.A.

(57) ABSTRACT

A computing device receives a filesystem image comprising a filesystem tree, a container runtime, and an on-board container registry including a plurality of container images, the on-board container registry operable to provide a container image to a requesting container runtime. The computing device is booted using the filesystem image. The computing device instructs the container runtime to initiate a first container from a first container image. The computing device requests, by the container runtime from the on-board container registry, the first container image. The computing device receives, by the container runtime, the first container image from the on-board container registry. The computing device initiates, by the container runtime, the first container from the first container image.

20 Claims, 7 Drawing Sheets

(56) References Cited

U.S. PATENT DOCUMENTS

2024/0354079 A1* 10/2024 Sidis ................ G06F 8/433

OTHER PUBLICATIONS

Author Unknown, "OSTree updates and rollback," Apertis, Sep. 15, 2021, https://www.apertis.org/guides/ostree/, 6 pages.
Author Unknown, "System updates and rollback," Apertis, Aug. 4, 2021, https://www.apertis.org/concepts/system-updates-and-rollback/system-updates-and-rollback.pdf, 31 pages.
Author Unknown, "A Fully Integrated Device Software Update Solution," witekio.com, https://witekio.com/de/blog-de/a-fully-integrated-device-software-update-solution/, accessed online Feb. 22, 2023, 10 pages.
Author Unknown, "SaaS Platform for Connected Cars: ATS Garage Onboard the GLM Electric Roadster," Cision US Inc., https://www.prnewswire.com/news-releases/saas-platform-for-connected-cars-ats-garage-onboard-the-glm-electric-roadster-611511795.html, Jan. 23, 2017, 4 pages.
Author Unknown, "Mercedes-Benz R&D creates 'container-driven cars' powered by Microsoft Azure," Microsoft Corp., https://customers.microsoft.com/en-us/story/784791-mercedes-benz-r-and-d-creates-container-driven-cars-powered-by-microsoft-azure, Mar. 27, 2020, 16 pages.
Author Unknown, "Automotive SIG documentation—Containers in automotive images," The centOS Project, Red Hat, Inc., https://sigs.centos.org/automotive/building/containers/, accessed online Feb. 22, 2023, 2 pages.
Aufranc, Jean-Luc, "Combining OSTree and SW Containers for reliable IoT Device updates," CNX Software—Embedded Systems News, Jun. 7, 2021, https://www.cnx-software.com/2021/06/07/combining-ostree-and-sw-containers-for-reliable-iot-device-updates/, 13 pages.
Ayres, Nicholas, et al., "Continuous Automotive Software Updates through Container Image Layers," Electronics 2021, 10, 739, https://doi.org/10.3390/electronics10060739, Mar. 20, 2021, 17 pages.
Breard, B. et al., "RHEL for Edge: update infrastructure quickstart," Red Hat Blog, Jun. 28, 2021, https://www.redhat.com/en/blog/rhel-edge-update-infrastructure-quickstart, 10 pages.
Non-final Office Action for U.S. Appl. No. 17/717,552, mailed Apr. 12, 2023, 16 pages.
Notice of Allowance and Notice of Allowability for U.S. Appl. No. 17/717,552, dated Feb. 1, 2024, 10 pages.

* cited by examiner

GENERATING FILESYSTEM IMAGES WITH INTEGRATED CONTAINER REGISTRIES HAVING CONTAINER RUNTIME TO INITIATE THE FIRST CONTAINER IMAGE

BACKGROUND

An image generation system, such as OSTree for Linux-based operating systems, can be used to create a filesystem image that contains all of the filesystem files of a bootable filesystem. Containerization technologies can be used to run containerized applications from container images to isolate resources and processes of the containerized applications from each other. A range of devices, such as edge devices, Internet of Things (IoT) devices, and vehicle Engine Control Units (ECUs), can implement bootable filesystems and containerization technologies, requiring container images to be obtained over a network. As the use of such devices increases, the ability to obtain container images from a known location or when a network is unavailable will be desirable.

SUMMARY

The examples disclosed herein implement a filesystem image service that performs generating filesystem images with integrated container registries. In particular, the filesystem image service can generate a filesystem image that includes a container registry of container images. A computing device can boot with the generated filesystem image and, as a result, the container registry can be on-board the computing device. Other computing devices in the computing system (e.g., other edge devices, IoT devices, ECUs) can then pull container images from the container registry that is on-board the computing device instead of pulling container images from the internet.

In one example, a method for generating filesystem images with integrated container registries is provided. The method includes receiving, by a first computing device, a filesystem image comprising a filesystem tree, a container runtime, and an on-board container registry including a plurality of container images, the on-board container registry operable to provide a container image to a requesting container runtime. The method further includes booting the first computing device using the filesystem image. The method further includes instructing the container runtime to initiate a first container from a first container image. The method further includes requesting, by the container runtime from the on-board container registry, the first container image. The method further includes receiving, by the container runtime, the first container image from the on-board container registry. The method further includes initiating, by the container runtime, the first container from the first container image.

In another example, a computing device for generating filesystem images with integrated container registries is provided. The computing device includes a memory and a processor device coupled to the memory. The processor device is to receive a filesystem image comprising a filesystem tree, a container runtime, and an on-board container registry including a plurality of container images, the on-board container registry operable to provide a container image to a requesting container runtime. The processor device is further to boot the computing device using the filesystem image. The processor device is further to instruct the container runtime to initiate a first container from a first container image. The processor device is further to request, by the container runtime from the on-board container registry, the first container image. The processor device is further to receive, by the container runtime, the first container image from the on-board container registry. The processor device is further to initiate, by the container runtime, the first container from the first container image.

In another example, a non-transitory computer-readable storage medium for generating filesystem images with integrated container registries is provided. The non-transitory computer-readable storage medium includes computer-executable instructions to cause a processor device to receive a filesystem image comprising a filesystem tree, a container runtime, and an on-board container registry including a plurality of container images, the on-board container registry operable to provide a container image to a requesting container runtime. The instructions further cause the processor device to boot a computing device using the filesystem image. The instructions further cause the processor device to instruct the container runtime to initiate a first container from a first container image. The instructions further cause the processor device to request, by the container runtime from the on-board container registry, the first container image. The instructions further cause the processor device to receive, by the container runtime, the first container image from the on-board container registry. The instructions further cause the processor device to initiate, by the container runtime, the first container from the first container image.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the elements unless otherwise explicitly specified. The word "or" as used herein and in the claims is inclusive unless contextually impossible. As an example, the recitation of A or B means A, or B, or both A and B. The word "data" may be used herein in the singular or plural depending on the context.

An image generation system, such as OSTree for Linux-based operating systems, can be used to create a filesystem image that contains all of the filesystem files of a bootable filesystem. The filesystem image created by image generation systems generally includes a filesystem tree comprising filesystem files. The image generation system can also be used to perform upgrades of the complete filesystem tree. OSTree, for example, is an image generation system for committing, downloading, and deploying bootable filesystem trees. Using the filesystem image, the bootable filesystem can be easily distributed, atomically updated, and/or replicated on target computing devices.

Containerization technologies, such as, by way of non-limiting example, Docker® container technology, Kubernetes® container technology, CoreOS (Rocket) container technology, Tectonic container technology, and the like, are increasingly popular due, in part, to their relatively low resource requirements compared to other process isolation mechanisms, such as virtual machines. Containerization technologies can be used to run containerized applications from container images to isolate resources and processes of the containerized applications from each other. A containerized application may include tens or hundreds of different containers and other resources.

A range of devices, such as edge devices, IoT devices, and vehicle ECUs, can implement bootable filesystems and containerization technologies. In a computing system with multiple computing devices, a container image may need to be obtained over a network, such as from cloud storage on the internet, however, there may be instances where the network may be unavailable or unsecure and a container image cannot be obtained.

The examples disclosed herein implement a filesystem image service that performs generating filesystem images with integrated container registries. In particular, the filesystem image service can generate a filesystem image that includes a container registry of container images, along with a filesystem tree and a container runtime. A computing device can boot with the generated filesystem image and, as a result, the container registry can be on-board the computing device. Other computing devices in the computing system (e.g., other edge devices, IoT devices, ECUs) can have a container runtime configured to pull container images from the container registry that is on-board the computing device that booted with the generated filesystem image. As a result, the other computing devices can pull container images from the container registry that is on-board the computing device instead of pulling container images from the internet.

Once a computing device pulls a container image from the container registry that is on-board the computing device that booted with the generated filesystem image, the computing device can initiate a containerized application with the container image. The computing device can pull the container image and initiate a container with the container image without accessing a network because the container registry is on-board the computing device that booted with the generated filesystem image and the container runtimes of the computing devices are configured to pull container images from the on-board container registry.

In some examples, the filesystem image service can generate filesystem images with more than one integrated container registry. For example, the container registries can each be configured to include container images for different categories of applications. A computing device in the computing system can boot with the generated filesystem image and the computing device can have each container registry on-board the computing device. Other computing devices in the computing system can be configured to pull container images from one or more of the container registries on-board the computing device booted with the generated filesystem image.

The term "containerized application" as used herein refers to an application that comprises one or more container images, and is initiated and managed via a container orchestration system. The term "containerized instance" as used herein refers to an entity that includes a container that is initiated from a container image. The phrase "container" as used herein refers to Linux® containers wherein the Linux® kernel uses namespaces to isolate processes from one another. The phrase "container image" as used herein refers to a static package of software comprising one or more layers, the layers including everything needed to run an application (i.e., as a container) that corresponds to the container image, including, for example, one or more of executable runtime code, system tools, system libraries and configuration settings. A Docker® image is an example of a container image. When executed, a container image is initiated as a Linux® container, wherein the Linux® kernel features cgroups and namespaces are used to isolate container processes from one another. A container image is often created from a containerization technology, such as, by way of non-limiting example, Docker®, or the like. The term "container orchestration system" refers to a system that automates the deployment, scaling, and management of containerized applications among nodes in a cluster. The Kubernetes® container orchestration system (Kubernetes.io) is one example of a container orchestration system. The term "resource" as used herein refers to any individual component managed by the container orchestration system for which, if requested, the container orchestration system will return information specific to the resource.

Figure 1:
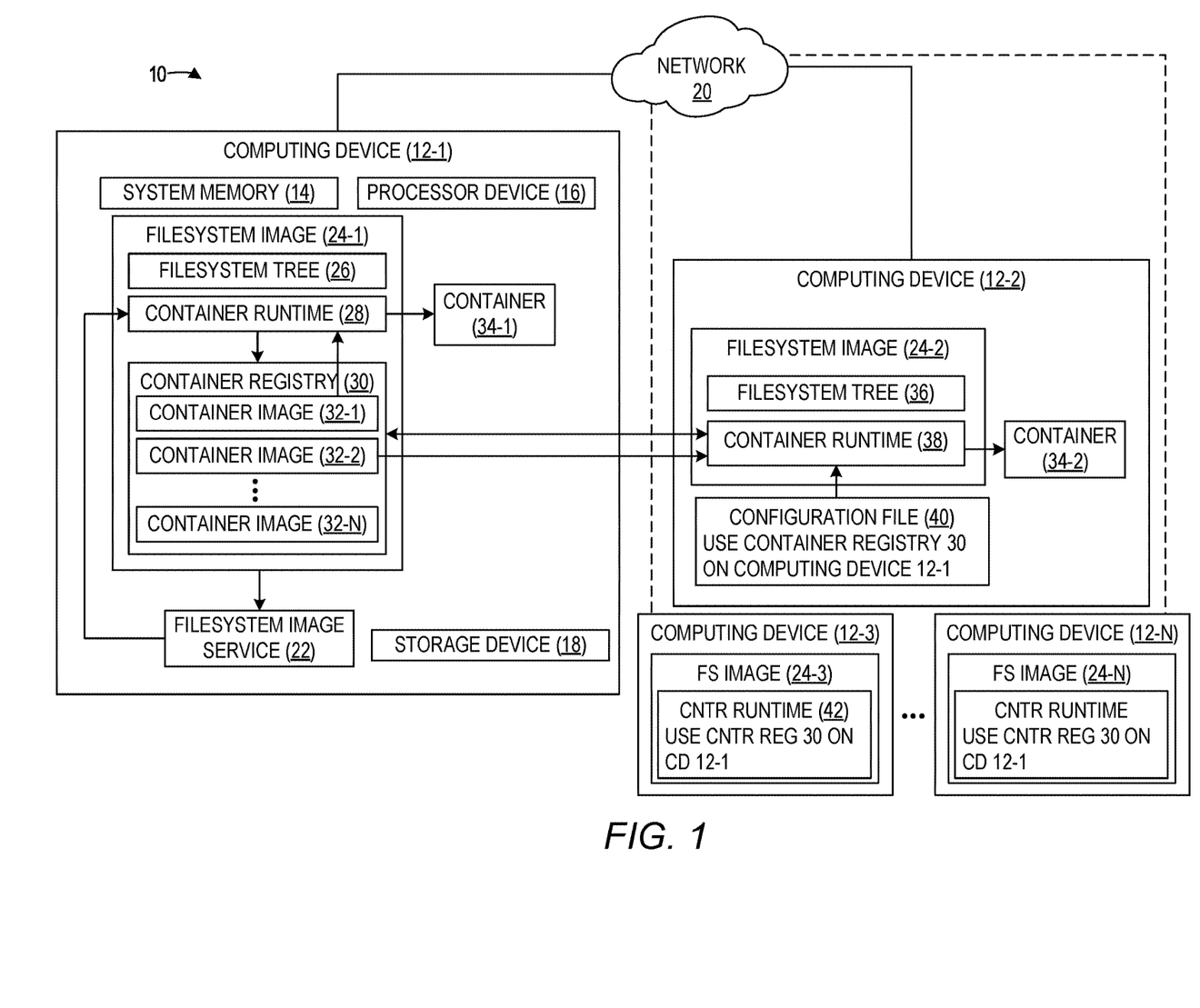
FIG. 1 is a block diagram of a computing system in which examples of generating filesystem images with integrated container registries may be practiced.

FIG. 1 is a block diagram of a computing system 10 that comprises computing devices, such as a first computing device 12-1 and a second computing device 12-2 (collectively, computing devices 12), each computing device comprising a system memory 14, a processor device 16, and a storage device 18, and connected by a network 20, in which examples of generating filesystem images with integrated container registries may be practiced. It is to be understood that the computing system 10 and computing devices 12 in some examples may include constituent elements in addition to those illustrated in FIG. 1. In the example of FIG. 1, the first computing device 12-1 implements a filesystem image service 22 that performs generating filesystem images with integrated container registries.

The filesystem image service 22 can receive a first filesystem image 24-1, such as an OSTree image as one non-limiting example. The first filesystem image 24-1 can include a filesystem tree 26, a container runtime 28, and an on-board container registry 30. The container runtime 28 can load container images from the on-board container registry 30, run containers on the first computing device 12-1, and monitor and isolate resources for a container on the first computing device 12-1. The on-board container registry 30 can include a plurality of container images 32-1-32-N (collectively, container images 32) for initiating containerized applications. The on-board container registry 30 can be operable to provide a container image from among the container images 32 to a requesting container runtime, such as the container runtime 28 or a container runtime associated with another filesystem image and/or another computing device in the computing system 10.

The first computing device 12-1 may be booted using the first filesystem image 24-1. As a result of booting the first computing device 12-1 with the first filesystem image 24-1 that includes the on-board container registry 30, the on-board container registry 30 can be part of the filesystem of the operating system of the first computing device 12-1. The filesystem image service 22 can instruct the container runtime 28 to initiate a first container 34-1 from a first container image 32-1 from among the container images 32. The container runtime 28 can request the first container image 32-1 from the on-board container registry 30 and receive the first container image 32-1 from the on-board container registry 30. For example, the container runtime 28 may be Docker® and the first container image 32-1 may be a Docker® image that the container runtime 28 requests and receives from the on-board container registry 30 by implementing a "docker pull" command that specifies the on-board container registry 30 as the Docker® registry to pull Docker® images from. In some implementations, a configuration file may identify the on-board container registry 30 as the container registry for the container runtime 28 to pull container images from.

The container runtime 28 can then initiate the first container 34-1 from the first container image 32-1. For example, the container runtime 28 may be Docker® and the first container image 32-1 may be a Docker® image that the container runtime 28 requested and received from the on-board container registry 30. The first container 34-1 can be initiated from the first container image 32-1 by implementing a "docker create" command that specifies the first container image 32-1 and a "docker start" command that specifies the name or identifier of the first container 34-1 that was created.

The second computing device 12-2 may receive a second filesystem image 24-2. The second filesystem image 24-2 can include a filesystem tree 36 and a container runtime 38. The container runtime 38 can load container images, run containers on the second computing device 12-2, and monitor and isolate resources for a container on the second computing device 12-2. The container runtime 38 can be configured to obtain container images from the on-board container registry 30 of the first computing device 12-1, such as the container images 32. In some implementations, a configuration file 40 may identify the first computing device 12-1 as including the on-board container registry 30 with the container images 32 for the second computing device 12-2 to use. In other implementations, the first computing device 12-1 may be identified as including the on-board container registry 30 with the container images 32 for the second computing device 12-2 to use when the second computing device 12-2 runs a "docker pull" command and specifies the on-board container registry 30 as the Docker® registry to pull Docker® images from by passing the on-board registry 30 location (e.g., an IP address) to the "docker pull" command.

The second computing device 12-2 may be booted using the second filesystem image 24-2. The second computing device 12-2 may be booted after the first computing device 12-1 is booted, or the second computing device 12-2 may be booted at the same time the first computing device 12-1 is booted. In some implementations, the computing devices 12 may be booted in an order specified by dependencies between the computing devices 12, such as in a configuration file or other component of the computing system 10. The container runtime 38 may be instructed (e.g., by the filesystem image service 22 or another component of the computing system 10) to initiate a second container 34-2 from a second container image 32-2 from among the container images 32 in the on-board container registry 30 of the first computing device 12-1. The container runtime 38 can request the second container image 32-2 from the on-board container registry 30 and receive the second container image 32-2 from the on-board container registry 30. For example, the container runtime 38 may be Docker® and the second container image 32-2 may be a Docker® image that the container runtime 38 requests and receives from the on-board container registry 30 by implementing a "docker pull" command that specifies the on-board container registry 30 as the Docker® registry to pull Docker® images from. The container runtime 38 can request the second container image 32-2 from the on-board container registry 30 and/or receive the second container image 32-2 from the on-board container registry 30 when the first computing device 12-1 and/or the second computing device 12-2 are not connected to the network 20 because the first computing device 12-1 includes the on-board container registry 30 and the container runtime 38 is configured to obtain or pull container images from the on-board container registry 30. For example, if the first computing device 12-1 goes down, then a local version of the first filesystem image 24-1, which was used to boot the first computing device 12-1 and contains the on-board container registry 30, can be used by the computing devices 12 in the computing system 10 so that the computing devices 12 can continue to pull the container images 32 from the on-board container registry 30.

In some implementations, the container runtime 38 can request the second container image 32-2 from the on-board container registry 30 by accessing the configuration file 40 and determining, based on the configuration file 40, that the container runtime 38 is to request container images, such as the second container image 32-2, from the on-board container registry 30 of the first computing device 12-1. For example, the configuration file 40 may include a list of all container registries that the container runtime 38 is configured for and specify for the container runtime 38 to pull container images from the on-board container registry 30 when the container runtime 38 is requested to pull a container image.

The container runtime 38 can then initiate the second container 34-2 from the second container image 32-2. For example, the container runtime 38 may be Docker® and the second container image 32-2 may be a Docker® image that the container runtime 38 requested and received from the on-board container registry 30. The second container 34-2 can be initiated from the second container image 32-2 by implementing a "docker create" command that specifies the second container image 32-2 and a "docker start" command that specifies the name or identifier of the second container 34-2 that was created.

The first computing device 12-1 and the second computing device 12-2 may be computing devices from among a plurality of computing devices 12 in the computing system 10. Each computing device of the plurality of computing devices 12 may be booted with a filesystem image that includes a container runtime configured to obtain container images from the on-board container registry 30. For example, a third computing device 12-3 may be booted with a third filesystem image 24-3 that includes a filesystem tree and a container runtime 42 configured to obtain container images from the on-board container registry 30 of the first computing device 12-1, such as the container images 32. As a result, the container runtime 42 can request and receive a container image from the container images 32 in the on-board container registry 30 of the first computing device 12-1 and initiate a container with a container image from the on-board container registry 30 with or without accessing the network 20.

It is to be understood that, because the filesystem image service 22 is a component of the first computing device 12-1, functionality implemented by the filesystem image service 22 may be attributed to the first computing device 12-1 generally. Moreover, in examples where the filesystem image service 22 comprises software instructions that program the processor device 16 to carry out functionality discussed herein, functionality implemented by the filesystem image service 22 may be attributed herein to the processor device 16. It is to be further understood that while, for purposes of illustration only, the filesystem image service 22 is depicted as a single component, the functionality implemented by the filesystem image service 22 may be implemented in any number of components, and the examples discussed herein are not limited to any particular number of components.

Figure 2:
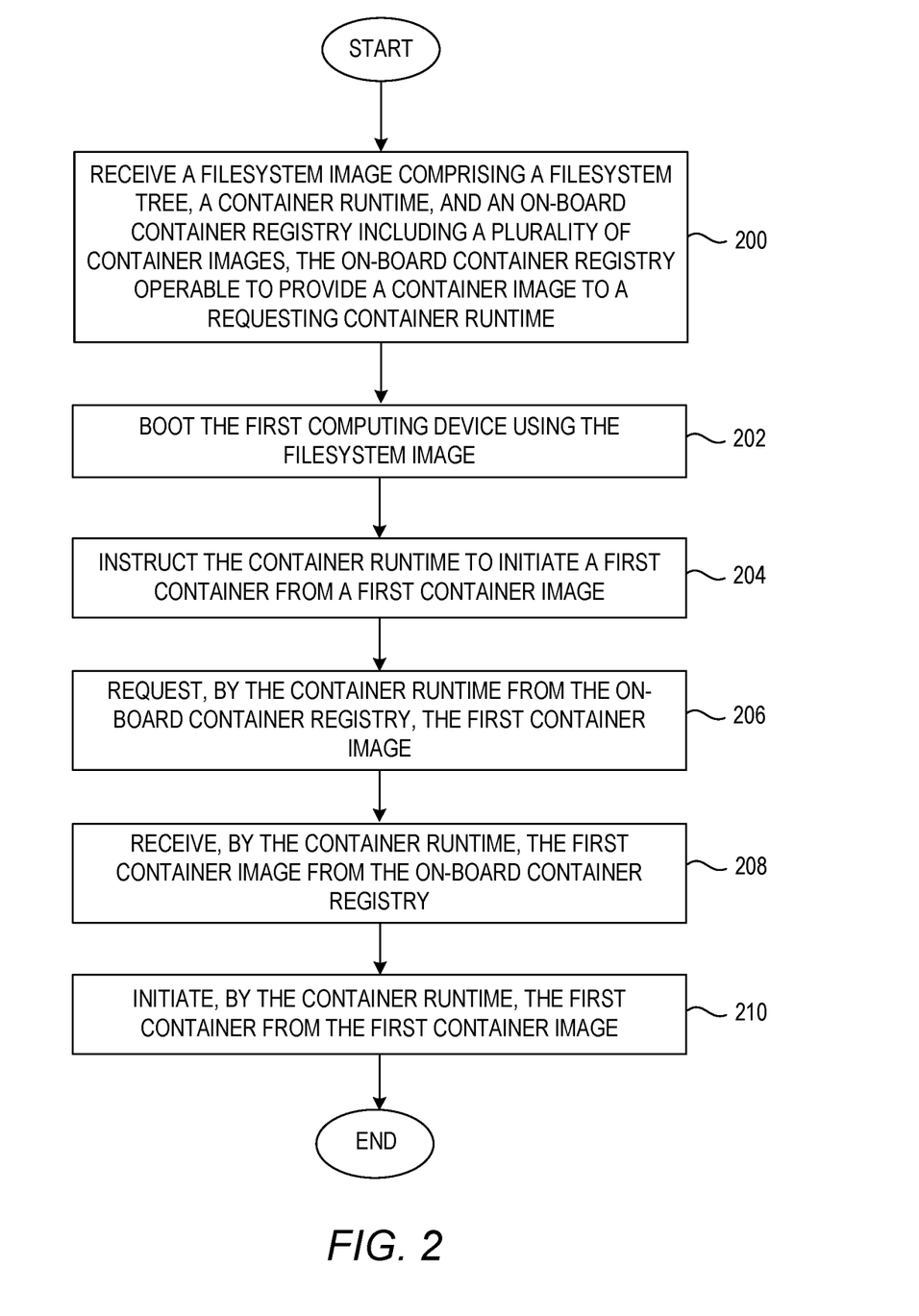
FIG. 2 is a flowchart illustrating operations performed by the computing system of FIG. 1 for generating filesystem images with integrated container registries, according to one example.

FIG. 2 is a flowchart illustrating operations performed by the computing system of FIG. 1 for generating filesystem images with integrated container registries, according to one example. Elements of FIG. 1 are referenced in describing FIG. 2 for the sake of clarity. In FIG. 2, operations begin with a processor device of a computing device, such as the processor device 16 of the first computing device 12-1 of FIG. 1, to receive a filesystem image comprising a filesystem tree, a container runtime, and an on-board container registry including a plurality of container images, the on-board container registry operable to provide a container image to a requesting container runtime (block 200). The processor device 16 is then to boot the first computing device using the filesystem image (block 202). The processor device 16 is then to instruct the container runtime to initiate a first container from a first container image (block 204). The processor device 16 is then to request, by the container runtime from the on-board container registry, the first container image (block 206). The processor device 16 is then to receive, by the container runtime, the first container image from the on-board container registry (block 208). The processor device 16 is then to initiate, by the container runtime, the first container from the first container image (block 210).

Figure 3:
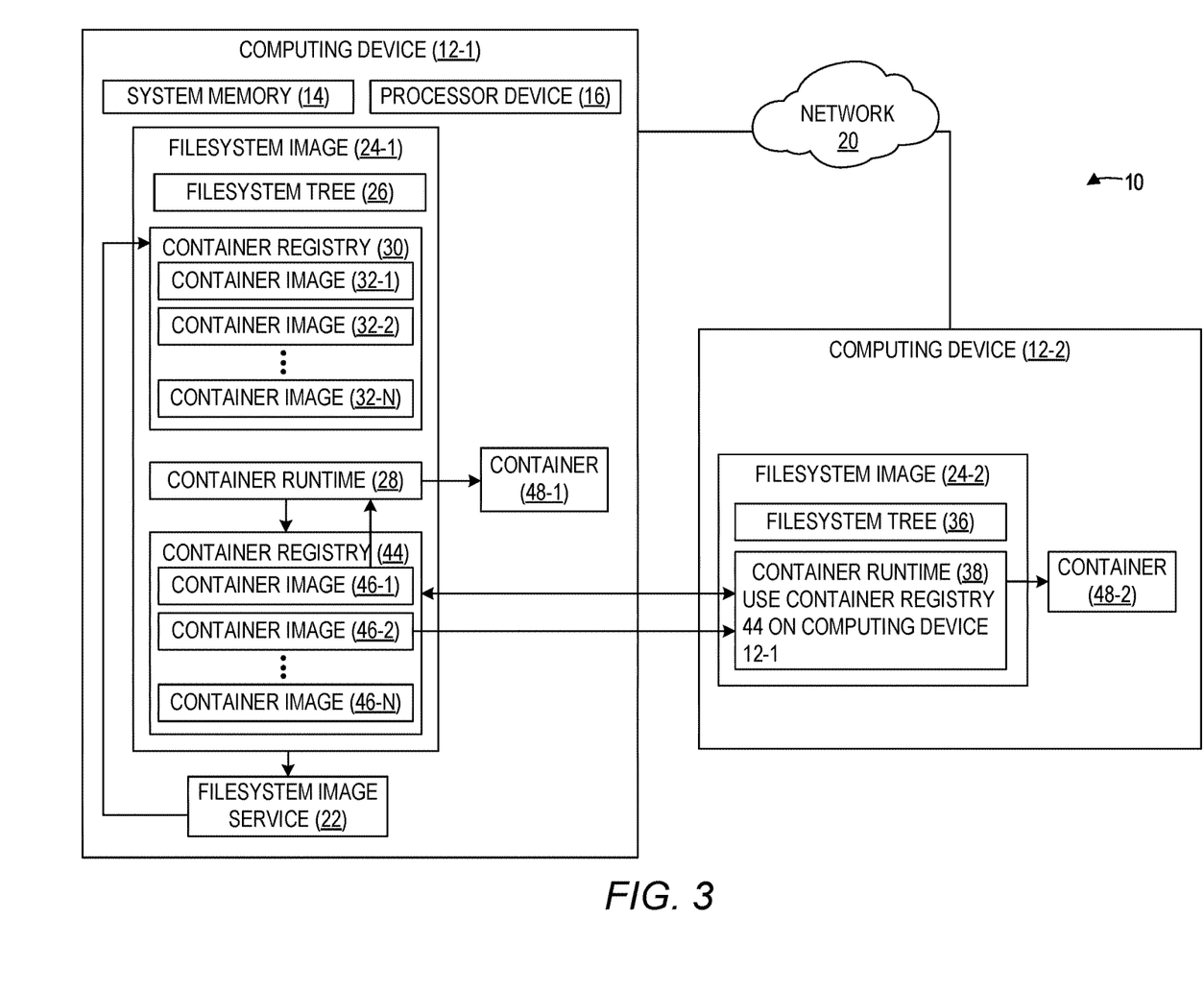
FIG. 3 is a block diagram of the computing system of FIG. 1 for generating filesystem images with integrated container registries, according to one example.

FIG. 3 is a block diagram of the computing system of FIG. 1 for generating filesystem images with integrated container registries, according to one example. Elements of FIG. 1 are referenced in describing FIG. 3 for the sake of clarity. In the example of FIG. 3, the filesystem image service 22 of the first computing device 12-1 may receive a filesystem image, such as the first filesystem image 24-1. The first filesystem image 24-1 in this example may include the filesystem tree 26, the container runtime 28, the on-board container registry 30, and another on-board container registry 44. The on-board container registry 30 may include the container images 32 and the on-board container registry 44 may include another plurality of container images 46-1-46-N (collectively, container images 46). The on-board container registry 30 and the on-board container registry 44 can both be operable to provide a container image from among the container images 32 and the container images 46, respectively, to a requesting container runtime, such as the container runtime 28, the container runtime 38, or a container runtime associated with another filesystem image and/or another computing device in the computing system 10. The first computing device 12-1 may be booted using the first filesystem image 24-1. As a result of booting the first computing device 12-1 with the first filesystem image 24-1 that includes the on-board container registry 30 and the on-board container registry 44, both the on-board container registry 30 and the on-board container registry 44 can be part of the filesystem of the operating system of the first computing device 12-1. The filesystem image service 22 can instruct the container runtime 28 to initiate a first container 48-1, from a container image from among the container images 46. The container runtime 28 can request a first container image 46-1 from the on-board container registry 44 and receive the first container image 46-1 from the on-board container registry 44. For example, the container runtime 28 may be Docker® and the first container image 46-1 may be a Docker® image that the container runtime 28 requests and receives from the on-board container registry 44 by implementing a "docker pull" command that specifies the on-board container registry 44 as the Docker® registry to pull Docker® images from. The container runtime 28 can then initiate the first container 48-1 from the first container image 46-1. For example, the container runtime 28 may be Docker® and the first container image 46-1 may be a Docker® image that the container runtime 28 requested and received from the on-board container registry 44. The first container 48-1 can be initiated from the first container image 46-1 by implementing a "docker create" command that specifies the first container image 46-1 and a "docker start" command that specifies the name or identifier of the first container 48-1 that was created.

The second computing device 12-2 may receive a filesystem image, such as the second filesystem image 24-2. The second filesystem image 24-2 may include the filesystem tree 36 and the container runtime 38. The container runtime 38 in this example can be configured to obtain container images from the on-board container registry 44 of the first computing device 12-1, such as the container images 46. In some implementations, a configuration file (e.g., the configuration file 40) may identify the first computing device 12-1 as including the on-board container registry 44 with the container images 46 for the second computing device 12-2 to use. The second computing device 12-2 may be booted using the second filesystem image 24-2. The container runtime 38 may be instructed (e.g., by the filesystem image service 22 or another component of the computing system 10) to initiate a second container 48-2 from a second container image 46-2 from among the container images 46 in the on-board container registry 44 of the first computing device 12-1. The container runtime 38 can request the second container image 46-2 from the on-board container registry 44 and receive the second container image 46-2 from the on-board container registry 44. For example, the container runtime 38 may be Docker® and the second container image 46-2 may be a Docker® image that the container runtime 38 requests and receives from the on-board container registry 44 by implementing a "docker pull" command that specifies the on-board container registry 44 as the Docker® registry to pull Docker® images from. The container runtime 38 can then initiate the second container 48-2 from the second container image 46-2. For example, the container runtime 38 may be Docker® and the second container image 46-2 may be a Docker® image that the container runtime 38 requested and received from the on-board container registry 44. The second container 48-2 can be initiated from the second container image 46-2 by implementing a "docker create" command that specifies the second container image 46-2 and a "docker start" command that specifies the name or identifier of the second container 48-2 that was created.

Figure 4:
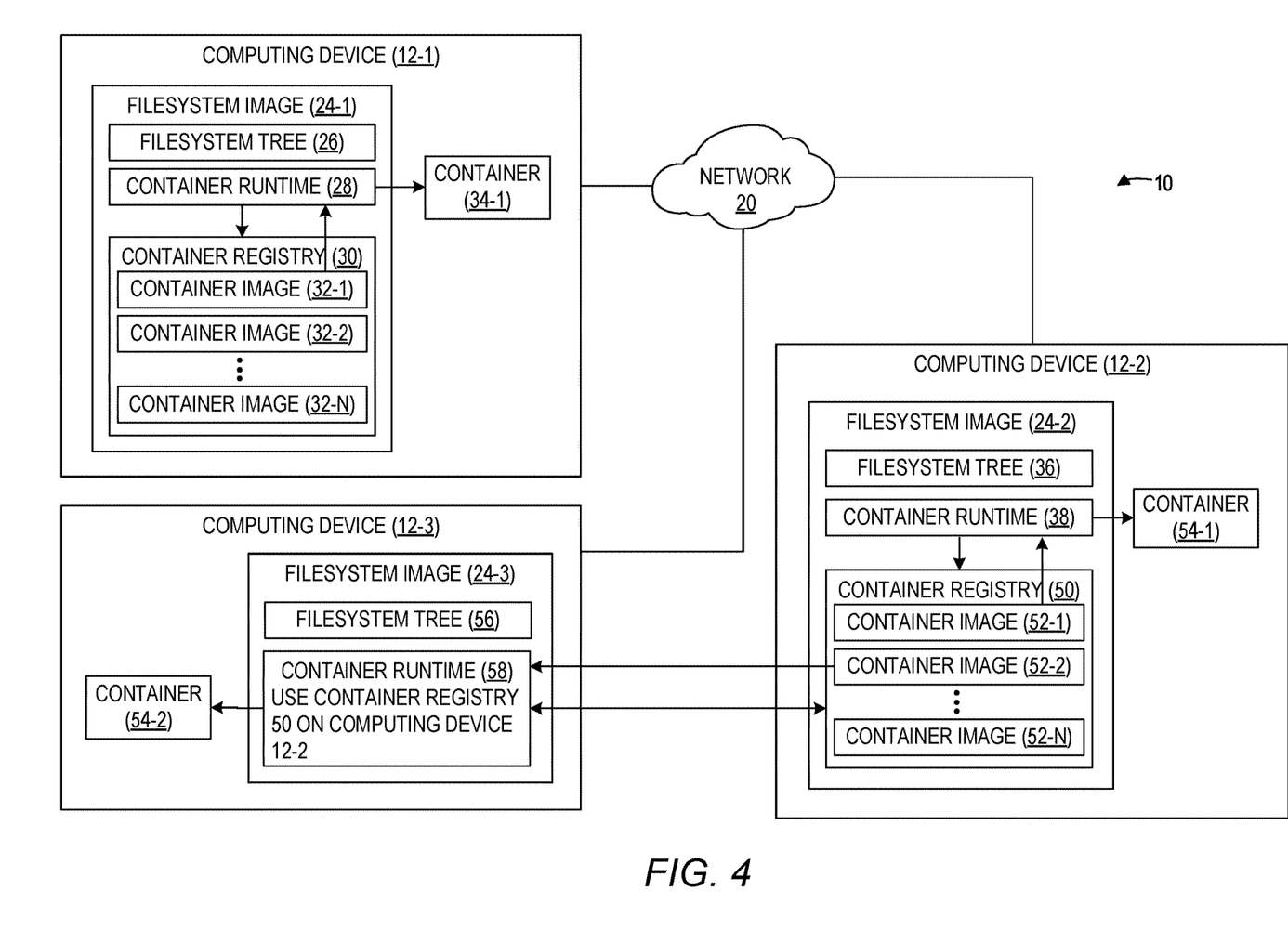
FIG. 4 is a block diagram of the computing system of FIG. 1 for generating filesystem images with integrated container registries, according to one example.

FIG. 4 is a block diagram of the computing system of FIG. 1 for generating filesystem images with integrated container registries, according to one example. Elements of FIG. 1 are referenced in describing FIG. 4 for the sake of clarity. In the example of FIG. 4, the second computing device 12-2 may receive a filesystem image, such as the second filesystem image 24-2. The second filesystem image 24-2 in this example may include the filesystem tree 36, the container runtime 38, and an on-board container registry 50. The on-board container registry 50 may include a plurality of container images 52-1-52-N (collectively, container images 52). The on-board container registry 50 can be operable to provide a container image from among the container images 52 to a requesting container runtime, such as the container runtime 28, the container runtime 38, or a container runtime associated with another filesystem image and/or another computing device in the computing system 10. The second computing device 12-2 may be booted using the second filesystem image 24-2. As a result of booting the second computing device 12-2 with the second filesystem image 24-2 that includes the on-board container registry 50, the on-board container registry 50 can be part of the filesystem of the operating system of the second computing device 12-2. The container runtime 38 can be instructed (e.g., by the filesystem image service 22 or another component of the computing system 10) to initiate a first container 54-1 from a container image from among the container images 52. The container runtime 38 can request a first container image 52-1 from the on-board container registry 50 and receive the first container image 52-1 from the on-board container registry 50. For example, the container runtime 38 may be Docker® and the first container image 52-1 may be a Docker® image that the container runtime 38 requests and receives from the on-board container registry 50 by implementing a "docker pull" command that specifies the on-board container registry 50 as the Docker® registry to pull Docker® images from. The container runtime 38 can then initiate the first container 54-1 from the first container image 52-1. For example, the container runtime 38 may be Docker® and the first container image 52-1 may be a Docker® image that the container runtime 38 requested and received from the on-board container registry 50. The first container 54-1 can be initiated from the first container image 52-1 by implementing a "docker create" command that specifies the first container image 52-1 and a "docker start" command that specifies the name or identifier of the first container 54-1 that was created.

A third computing device 12-3 from among the computing devices 12 in the computing system 10 may receive a third filesystem image 24-3. The third filesystem image 24-3 may include a filesystem tree 56 and a container runtime 58. The container runtime 58 can be configured to obtain container images from the on-board container registry 50 of the second computing device 12-2, such as the container images 52. In some implementations, a configuration file (e.g., the configuration file 40) may identify the second computing device 12-2 as including the on-board container registry 50 with the container images 52 for the third computing device 12-3 to use. The third computing device 12-3 may be booted using the third filesystem image 24-3. The container runtime 58 may be instructed (e.g., by the filesystem image service 22 or another component of the computing system 10) to initiate a second container 54-2 from a second container image 52-2 from among the container images 52 in the on-board container registry 50 of the second computing device 12-2. The container runtime 58 can request the second container image 52-2 from the on-board container registry 50 and receive the second container image 52-2 from the on-board container registry 50. For example, the container runtime 58 may be Docker® and the second container image 52-2 may be a Docker® image that the container runtime 58 requests and receives from the on-board container registry 50 by implementing a "docker pull" command that specifies the on-board container registry 50 as the Docker® registry to pull Docker® images from. The container runtime 58 can then initiate the second container 54-2 from the second container image 52-2. For example, the container runtime 58 may be Docker® and the second container image 52-2 may be a Docker® image that the container runtime 58 requested and received from the on-board container registry 50. The second container 54-2 can be initiated from the second container image 52-2 by implementing a "docker create" command that specifies the second container image 52-2 and a "docker start" command that specifies the name or identifier of the second container 54-2 that was created.

In some examples, the first computing device 12-1 may be a first ECU in a vehicle and the second computing device 12-2 may be a second ECU in the same vehicle. The first ECU (i.e., the first computing device 12-1) may be booted with the first filesystem image 24-1 that includes the filesystem tree 26, the container runtime 28, and the on-board container registry 30 with container images 32. The second ECU (i.e., the second computing device 12-2) may be booted with the second filesystem image 24-2 that includes the filesystem tree 36, the container runtime 38, and the on-board container registry 50 with container images 52. The container images 32 in the on-board container registry 30 can be container images for Automotive Safety Integrity Level (ASIL) applications. The container images 52 in the on-board container registry 50 can be container images for Quality Management (QM) applications. Both ASIL and QM applications may be defined by the ISO 26262 standard for functional safety for road vehicles. The first ECU with the on-board container registry 30 with the container images 32 for ASIL applications may be booted before the second ECU with the on-board container registry 50 with the container images 52 for QM applications. Such an order for booting the ECUs may be determined based on a configuration file or another component of the computing system 10 that identifies an order for booting the ECUs. In some implementations, data for an application can be obtained and read (e.g., by the filesystem image service 22 or another component of the computing system 10) to determine whether the application is an ASIL application or a QM application and the container corresponding to the application can be put into the appropriate container registry based on the type of the application (e.g., ASIL application containers into the on-board container registry 30 and QM application containers into the on-board container registry 50 by the filesystem image service 22 or another component of the computing system 10).

Figure 5:
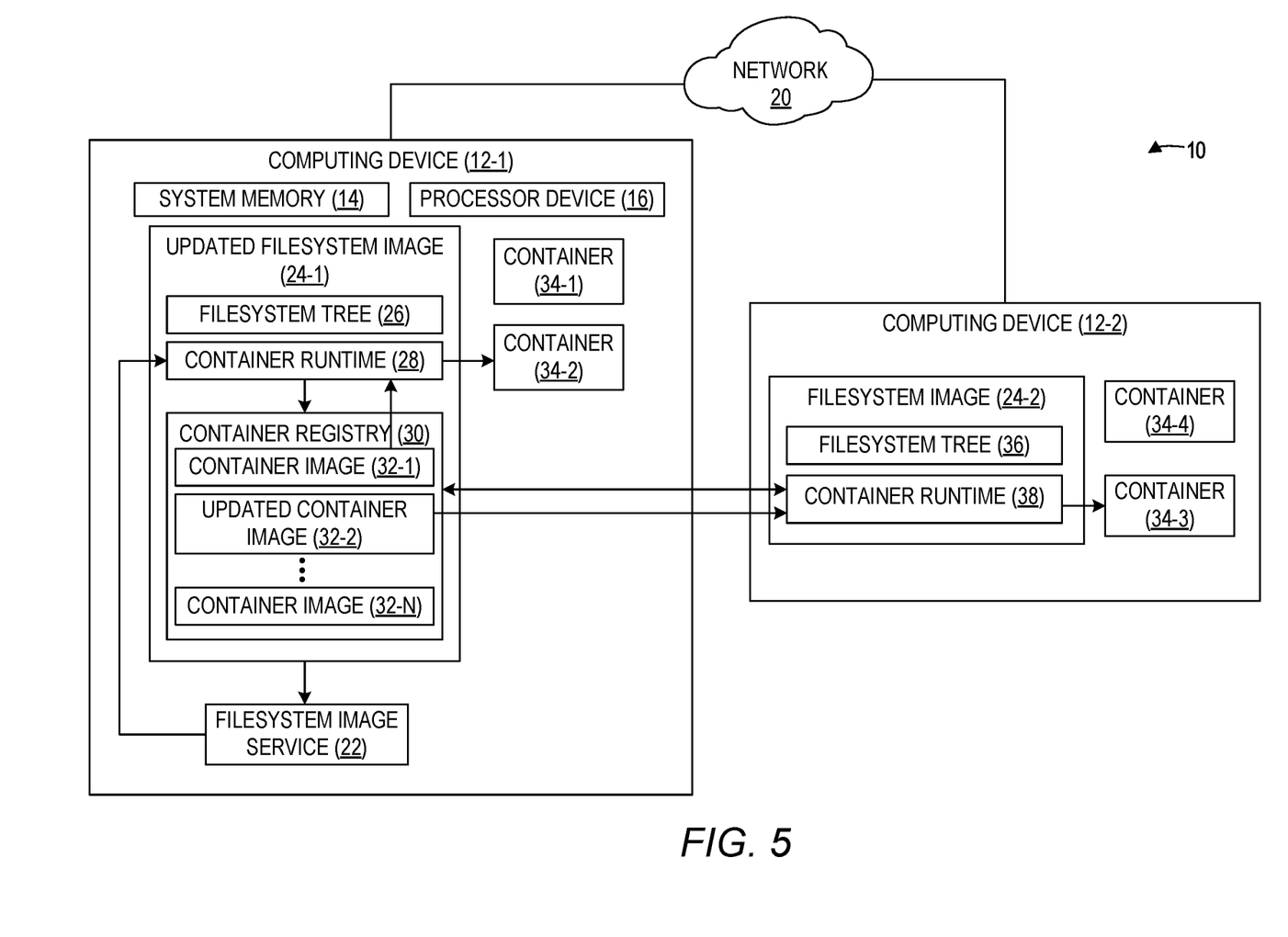
FIG. 5 is a block diagram of the computing system of FIG. 1 for generating filesystem images with integrated container registries, according to one example.

FIG. 5 is a block diagram of the computing system of FIG. 1 for generating filesystem images with integrated container registries, according to one example. Elements of FIG. 1 are referenced in describing FIG. 5 for the sake of clarity. In the example of FIG. 5, the filesystem image service 22 may determine that an updated filesystem image, such as an update to the first filesystem image 24-1, is available. The updated first filesystem image 24-1 can include the filesystem tree 26, the container runtime 28, and the on-board container registry 30 with the container images 32. The update to the first filesystem image 24-1 may be an update to the filesystem tree 26 and/or an update to one or more of the container images 32 in the on-board container registry 30. In some implementations, an update to the on-board container registry 30 may appear as a regular system update. The filesystem image service 22 may determine that the update to the first filesystem image 24-1 is available as the computing devices 12 boot and the container runtimes (e.g., the container runtime 28, the container runtime 38) check for updates when the filesystem image (e.g., the first filesystem image 24-1, the second filesystem image 24-2) starts. In some examples, the computing device with the on-board container registry (e.g., the on-board container registry 30 of the first computing device 12-1) may indicate whether there is an update.

The first computing device 12-1 can then be booted with the updated first filesystem image 24-1 (i.e., rebooted). As a result of booting the first computing device 12-1 with the updated first filesystem image 24-1 that includes an updated on-board container registry 30, the filesystem of the operating system of the first computing device 12-1 can include the updated container images 32 in the updated on-board container registry 30. For example, the updated first filesystem image 24-1 can be an OSTree image. In order to update the on-board container registry 30, an OSTree commit can be updated with the updated container images 32 in the on-board container registry 30. The OSTree commit can be built into an OSTree image, the OSTree image can be pushed (i.e., uploaded) onto the first computing device 12-1 and installed. Then when the first computing device 12-1 reboots, the new OSTree image can be used and the updated on-board container registry 30 can become available to the computing devices 12 in the computing system 10, so computing devices 12 with container runtimes configured to pull (i.e., download) the container images 32 from the on-board container registry 30 of the first computing device 12-1 can obtain the updated container images 32 that are in the on-board container registry 30.

The filesystem image service 22 can instruct the container runtime 28 to initiate a second container 34-2 from the first container image 32-1 from among the container images 32. The container runtime 28 can request the first container image 32-1 from the on-board container registry 30 and receive the first container image 32-1 from the on-board container registry 30. For example, the container runtime 28 may be Docker® and the first container image 32-1 may be a Docker® image that the container runtime 28 requests and receives from the on-board container registry 30 by implementing a "docker pull" command that specifies the on-board container registry 30 as the Docker® registry to pull Docker® images from. The container runtime 28 can then initiate the second container 34-2 from the first container image 32-1. For example, the container runtime 28 may be Docker® and the first container image 32-1 may be a Docker® image that the container runtime 28 requested and received from the on-board container registry 30. The second container 34-2 can be initiated from the first container image 32-1 by implementing a "docker create" command that specifies the first container image 32-1 and a "docker start" command that specifies the name or identifier of the second container 34-2 that was created.

In another example, the second computing device 12-2 may determine that an update to the second container image 32-2 is available, such as after the reboot of the first computing device 12-1 with the updated first filesystem image 24-1. For example, the second computing device 12-2 may use a package manager or other service to check for filesystem image upgrades, and the check may indicate that there is an upgrade to the second container image 32-2 because the second container image 32-2 version in the on-board container registry 30 differs from the second container image 32-2 version that the second computing device 12-2 currently has. The container runtime 38 can be instructed (e.g., by the filesystem image service 22 or another component of the computing system 10) to initiate a third container 34-3 from the updated second container image 32-2 in the on-board container registry 30. The container runtime 38 can request the updated second container image 32-2 from the on-board container registry 30 and receive the updated second container image 32-2 from the on-board container registry 30. The container runtime 38 can then initiate the third container 34-3 from the updated second container image 32-2.

Figure 6:
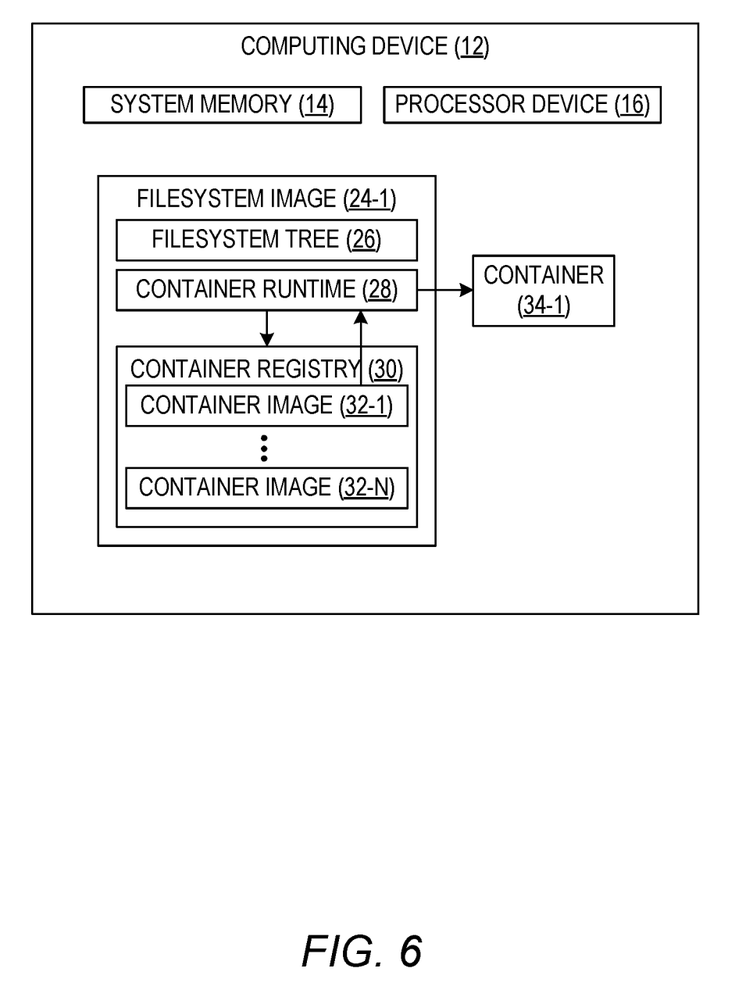
FIG. 6 is a block diagram of the computing system of FIG. 1 for generating filesystem images with integrated container registries, according to one example.

FIG. 6 is a simpler block diagram of the computing system of FIG. 1 for generating filesystem images with integrated container registries, according to one example. Elements of FIG. 1 are referenced in describing FIG. 6 for the sake of clarity. In the example of FIG. 6, the computing system 10 includes the first computing device 12-1, the system memory 14, and the processor device 16 coupled to the system memory 14. The processor device 16 is to receive a filesystem image 24-1 comprising a filesystem tree 26, a container runtime 28, and an on-board container registry 30 including a plurality of container images 32-1-32-N, the on-board container registry 30 operable to provide a container image to a requesting container runtime. The processor device 16 is further to boot the first computing device 12-1 using the filesystem image 24-1. The processor device 16 is further to instruct the container runtime 28 to initiate a first container 34-1 from a first container image 32-1. The processor device 16 is further to request, by the container runtime 28 from the on-board container registry 30, the first container image 32-1. The processor device 16 is further to receive, by the container runtime 28, the first container image 32-1 from the on-board container registry 30. The processor device 16 is further to initiate, by the container runtime 28, the first container 34-1 from the first container image 32-1.

Figure 7:
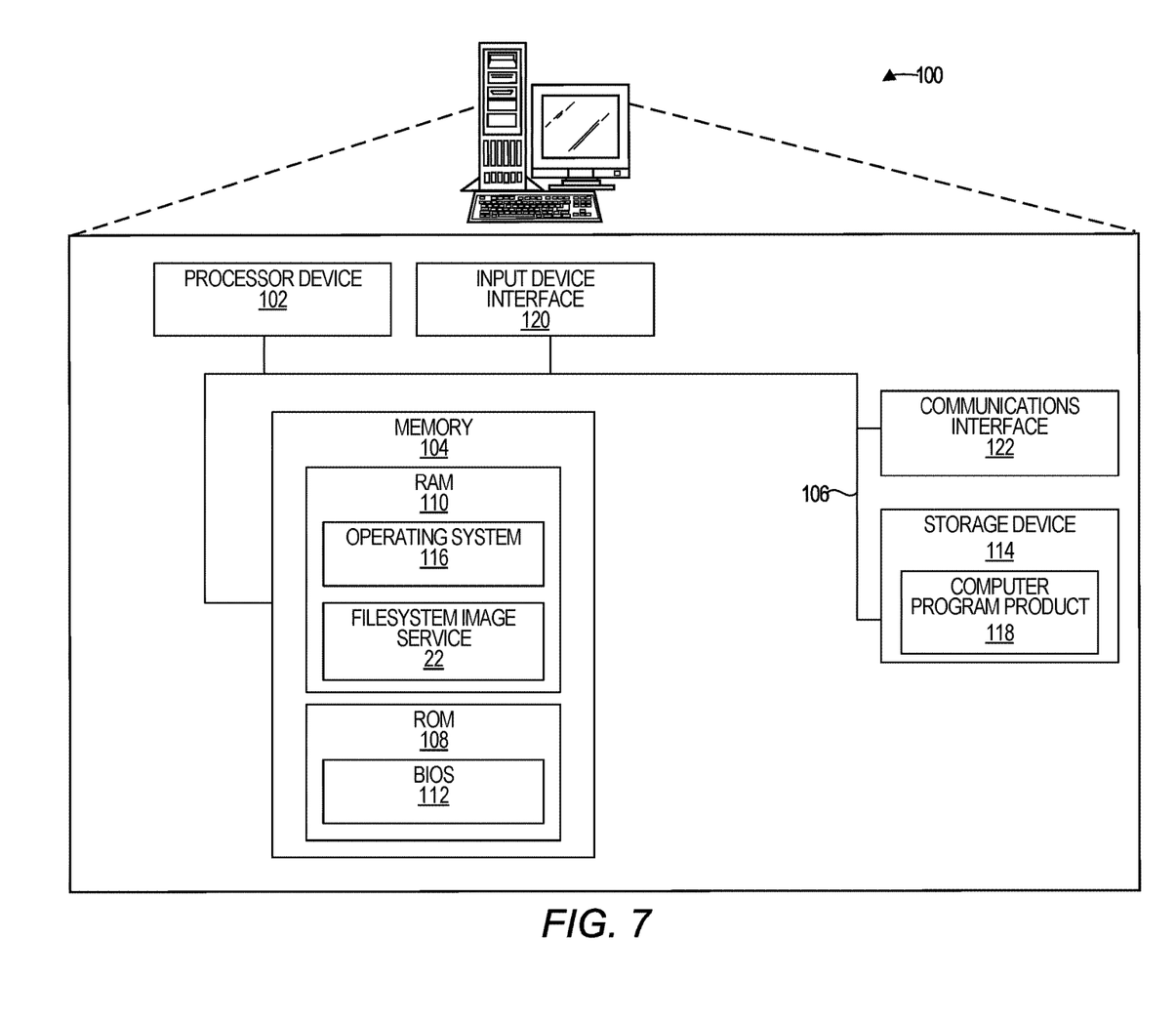
FIG. 7 is a block diagram of a computing device suitable for implementing examples, according to one example.

FIG. 7 is a block diagram of a computing device 100, such as the first computing device 12-1, suitable for implementing examples according to one example. The computing device 100 may comprise any computing or electronic device capable of including firmware, hardware, and/or executing software instructions to implement the functionality described herein. The computing device 100 includes a processor device 102, such as the processor device 16, a system memory 104, such as the system memory 14, and a system bus 106. The system bus 106 provides an interface for system components including, but not limited to, the system memory 104 and the processor device 102. The processor device 102 can be any commercially available or proprietary processor.

The system bus 106 may be any of several types of bus structures that may further interconnect to a memory bus (with or without a memory controller), a peripheral bus, and/or a local bus using any of a variety of commercially available bus architectures. The system memory 104 may include non-volatile memory 108 (e.g., read-only memory (ROM), erasable programmable read-only memory (EPROM), electrically erasable programmable read-only memory (EEPROM), etc.), and volatile memory 110 (e.g., random-access memory (RAM)). A basic input/output system (BIOS) 112 may be stored in the non-volatile memory 108 and can include the basic routines that help to transfer information between elements within the computing device 100. The volatile memory 110 may also include a high-speed RAM, such as static RAM, for caching data.

The computing device 100 may further include or be coupled to a non-transitory computer-readable storage medium such as a storage device 114, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 114 and other drives associated with computer-readable media and computer-usable media may provide non-volatile storage of data, data structures, computer-executable instructions, and the like.

A number of modules can be stored in the storage device 114 and in the volatile memory 110, including an operating system 116 and one or more program modules, such as the filesystem image service 22, which may implement the functionality described herein in whole or in part. All or a portion of the examples may be implemented as a computer program product 118 stored on a transitory or non-transitory computer-usable or computer-readable storage medium, such as the storage device 114, which includes complex programming instructions, such as complex computer-readable program code, to cause the processor device 102 to carry out the steps described herein. Thus, the computer-readable program code can comprise software instructions for implementing the functionality of the examples described herein when executed on the processor device 102. The processor device 102, in conjunction with the filesystem image service 22 in the volatile memory 110, may serve as a controller, or control system, for the computing device 100 that is to implement the functionality described herein.

An operator, such as a user, may also be able to enter one or more configuration commands through a keyboard (not illustrated), a pointing device such as a mouse (not illustrated), or a touch-sensitive surface such as a display device (not illustrated). Such input devices may be connected to the processor device 102 through an input device interface 120 that is coupled to the system bus 106 but can be connected by other interfaces such as a parallel port, an Institute of Electrical and Electronic Engineers (IEEE) 1394 serial port, a Universal Serial Bus (USB) port, an IR interface, and the like. The computing device 100 may also include a communications interface 122 suitable for communicating with the network as appropriate or desired. The computing device 100 may also include a video port (not illustrated) configured to interface with the display device (not illustrated), to provide information to the user.

Individuals will recognize improvements and modifications to the preferred examples of the disclosure. All such improvements and modifications are considered within the scope of the concepts disclosed herein and the claims that follow.

What is claimed is:

1. A method, comprising:
    receiving, by a first computing device, a first filesystem image comprising a first filesystem tree, a first container runtime, and a first on-board container registry including a first plurality of container images, the first on-board container registry operable to provide container images to requesting container runtimes;
    booting the first computing device using the first filesystem image;
    instructing the first container runtime to initiate a first container from a first container image of the first plurality of container images of the first on-board container registry;
    accessing, by the first container runtime, a configuration file, the configuration file identifying the first computing device as including the first on-board container registry;
    requesting, by the first container runtime from the first on-board container registry, the first container image;
    receiving, by the first container runtime, the first container image from the first on-board container registry; and
    initiating, by the first container runtime, the first container from the first container image.

2. The method of claim 1, further comprising:
    receiving, by a second computing device, a second filesystem image comprising a second filesystem tree and a second container runtime, the second container runtime configured to obtain container images from the first on-board container registry;
    booting the second computing device using the second filesystem image;
    instructing the second container runtime to initiate a second container from a second container image of the first plurality of container images of the first on-board container registry;
    requesting, by the second container runtime from the first on-board container registry, the second container image;
    receiving, by the second container runtime, the second container image from the first on-board container registry; and
    initiating, by the second container runtime, the second container from the second container image.

3. The method of claim 2, wherein requesting, by the second container runtime from the first on-board container registry, the second container image comprises:
    accessing, by the second container runtime, the configuration file, the configuration file identifying the first computing device as including the first on-board container registry; and
    determining, by the second container runtime based on the configuration file, to request the second container image from the first on-board container registry of the first computing device.

4. The method of claim 2, wherein requesting, by the second container runtime from the first on-board container registry, the second container image occurs when the first computing device and the second computing device are not connected to a network.

5. The method of claim 2, wherein booting the second computing device using the second filesystem image occurs subsequent to booting the first computing device using the first filesystem image.

6. The method of claim 2, further comprising:
determining, by the second computing device, that an updated second container image is available;
instructing the second container runtime to initiate a third container from the updated second container image;
requesting, by the second container runtime from the first on-board container registry, the updated second container image;
receiving, by the second container runtime, the updated second container image from the first on-board container registry; and
initiating, by the second container runtime, the third container from the updated second container image.

7. The method of claim 1, further comprising:
receiving, by the first computing device, a second filesystem image comprising a second filesystem tree, the first container runtime, the first on-board container registry including the first plurality of container images and a second on-board container registry including a second plurality of container images, the first on-board container registry and the second on-board container registry operable to provide container images to requesting container runtimes;
booting the first computing device using the second filesystem image;
instructing the first container runtime to initiate a second container from a second container image of the second plurality of container images of the second on-board container registry;
requesting, by the first container runtime from the second on-board container registry, the second container image;
receiving, by the first container runtime, the second container image from the second on-board container registry; and
initiating, by the first container runtime, the second container from the second container image.

8. The method of claim 7, further comprising:
receiving, by a second computing device, a third filesystem image comprising a third filesystem tree and a second container runtime, the second container runtime configured to obtain container images from the second on-board container registry;
booting the second computing device using the third filesystem image;
instructing the second container runtime to initiate a third container from a third container image of the second plurality of container images of the second on-board container registry;
requesting, by the second container runtime from the second on-board container registry, the third container image;
receiving, by the second container runtime, the third container image from the second on-board container registry; and
initiating, by the second container runtime, the third container from the third container image.

9. The method of claim 1, further comprising:
receiving, by a second computing device, a second filesystem image comprising a second filesystem tree, a second container runtime, and a second on-board container registry including a second plurality of container images, the second on-board container registry operable to provide container images to requesting container runtimes;
booting the second computing device using the second filesystem image;
instructing the second container runtime to initiate a second container from a second container image of the second plurality of container images of the second on-board container registry;
requesting, by the second container runtime from the second on-board container registry, the second container image;
receiving, by the second container runtime, the second container image from the second on-board container registry; and
initiating, by the second container runtime, the second container from the second container image.

10. The method of claim 9, further comprising:
receiving, by a third computing device, a third filesystem image comprising a third filesystem tree and a third container runtime, the third container runtime configured to obtain container images from the second on-board container registry;
booting the third computing device using the third filesystem image;
instructing the third container runtime to initiate a third container from a third container image of the second plurality of container images of the second on-board container registry;
requesting, by the third container runtime from the second on-board container registry, the third container image;
receiving, by the third container runtime, the third container image from the second on-board container registry; and
initiating, by the third container runtime, the third container from the third container image.

11. The method of claim 9, wherein the first computing device is a first Engine Control Unit (ECU) in a vehicle and the second computing device is a second ECU in the vehicle, and wherein the first on-board container registry includes a plurality of container images for Automotive Safety Integrity Level applications and the second on-board container registry includes a plurality of container images for Quality Management applications.

12. The method of claim 1, wherein the first computing device is a computing device from among a plurality of computing devices of a computing system and each computing device of the plurality of computing devices is booted with one of a plurality of filesystem images comprising the first filesystem image, each of the plurality of filesystem images comprising one of a plurality of container runtimes comprising the first container runtime, each of the plurality of container runtimes being configured to obtain container images from an on-board container registry.

13. The method of claim 1, further comprising:
determining that an updated first filesystem image comprising the first filesystem tree, the first container runtime, and the first on-board container registry including the first plurality of container images is available;
booting the first computing device using the updated first filesystem image;

instructing the first container runtime to initiate a second container from a second container image of the first plurality of container images of the first on-board container registry;

requesting, by the first container runtime from the first on-board container registry, the second container image;

receiving, by the first container runtime, the second container image from the first on-board container registry; and initiating, by the first container runtime, the second container from the second container image.

14. The method of claim 13, wherein updating the first filesystem image comprises one or more of:

updating at least one container image from among the first plurality of container images in the first on-board container registry; or updating the first filesystem tree.

15. A computing device, comprising:

a memory; and a processor device coupled to the memory, the processor device to:

receive a first filesystem image comprising a first filesystem tree, a first container runtime, and a first on-board container registry including a first plurality of container images, the first on-board container registry operable to provide container images to requesting container runtimes;

boot the computing device using the first filesystem image;

instruct the first container runtime to initiate a first container from a first container image of the first plurality of container images of the first on-board container registry;

access a configuration file, the configuration file identifying the computing device as including the first on-board container registry;

request, from the first on-board container registry, the first container image;

receive the first container image from the first on-board container registry; and initiate the first container from the first container image.

16. The computing device of claim 15, wherein the processor device is further to:

receive, a second filesystem image comprising a second filesystem tree, a second container runtime, the first on-board container registry including the first plurality of container images and a second on-board container registry including a second plurality of container images, the first on-board container registry and the second on-board container registry operable to provide container images to requesting container runtimes;

boot the computing device using the second filesystem image;

instruct the second container runtime to initiate a second container from a second container image of the second plurality of container images of the second on-board container registry;

request, from the second on-board container registry, the second container image;

receive the second container image from the second on-board container registry; and initiate the second container from the second container image.

17. The computing device of claim 15, wherein the processor device is further to:

determine that an updated first filesystem image comprising the first filesystem tree, the first container runtime, and the first on-board container registry including the first plurality of container images is available;

boot the computing device using the updated first filesystem image;

instruct the first container runtime to initiate a second container from a second container image of the first plurality of container images of the first on-board container registry;

request, from the first on-board container registry, the second container image;

receive the second container image from the first on-board container registry; and initiate the second container from the second container image.

18. A non-transitory computer-readable storage medium that includes computer-executable instructions that, when executed, cause one or more processor devices to:

receive a first filesystem image comprising a first filesystem tree, a first container runtime, and a first on-board container registry including a first plurality of container images, the first on-board container registry operable to provide container images to requesting container runtimes;

boot a computing device using the first filesystem image;

instruct the first container runtime to initiate a first container from a first container image of the first plurality of container images of the first on-board container registry;

access a configuration file, the configuration file identifying the computing device as including the first on-board container registry;

request, from the first on-board container registry, the first container image;

receive the first container image from the first on-board container registry; and initiate the first container from the first container image.

19. The non-transitory computer-readable storage medium of claim 18, wherein the instructions are further to cause the one or more processor devices to:

receive, a second filesystem image comprising a second filesystem tree, a second container runtime, the first on-board container registry including the first plurality of container images and a second on-board container registry including a second plurality of container images, the first on-board container registry and the second on-board container registry operable to provide container images to requesting container runtimes;

boot the computing device using the second filesystem image;

instruct the second container runtime to initiate a second container from a second container image of the second plurality of container images of the second on-board container registry;

request, from the second on-board container registry, the second container image;

receive the second container image from the second on-board container registry; and initiate the second container from the second container image.

20. The non-transitory computer-readable storage medium of claim 18, wherein the instructions are further to cause the one or more processor devices to:

determine that an updated first filesystem image comprising the first filesystem tree, the first container runtime, and the first on-board container registry including the first plurality of container images is available;

boot the computing device using the updated first filesystem image;

instruct the first container runtime to initiate a second container from a second container image of the first plurality of container images of the first on-board container registry;

request, from the first on-board container registry, the second container image;

receive the second container image from the first on-board container registry; and initiate the second container from the second container image.

* * * * *